United States Patent [19]
Wilson et al.

[11] Patent Number: 5,353,374
[45] Date of Patent: Oct. 4, 1994

[54] LOW BIT RATE VOICE TRANSMISSION FOR USE IN A NOISY ENVIRONMENT

[75] Inventors: Dennis L. Wilson, Palo Alto; James L. Wayman, Pebble Beach, both of Calif.

[73] Assignee: Loral Aerospace Corporation, New York, N.Y.

[21] Appl. No.: 963,101

[22] Filed: Oct. 19, 1992

[51] Int. Cl.$^5$ ............................ G10L 9/14; G10L 3/02
[52] U.S. Cl. .................................. 395/2.35; 395/2.28
[58] Field of Search ...................... 381/29–40; 395/2.35, 2.28, 2.25–2.27, 2.36, 2.37

[56] References Cited

U.S. PATENT DOCUMENTS

| | | | |
|---|---|---|---|
| 4,718,087 | 1/1988 | Papamichalis | 395/2.31 |
| 4,720,861 | 1/1988 | Bertrand | 381/36 |
| 4,724,535 | 2/1988 | Ono | 375/122 |
| 4,752,956 | 6/1988 | Sluijter | 395/2.28 |
| 4,797,925 | 1/1989 | Lin | 395/2.32 |
| 4,815,134 | 3/1989 | Picone et al. | 395/2.31 |
| 4,864,620 | 9/1989 | Bialick | 395/2.16 |
| 4,903,303 | 2/1990 | Taguchi | 381/31 |
| 4,932,061 | 6/1990 | Kroon et al. | 395/2.32 |

OTHER PUBLICATIONS

Wayman et al., "Some Improvements on the Synchronized–Overlap–Add Method of Time Scale Modification for Use in Real–Time Speech Compression and Noise Filtering", IEEE/ASSP Journal, Jan. 1988, pp. 139–140.

*Primary Examiner*—David D. Knepper
*Attorney, Agent, or Firm*—Perman & Green

[57] ABSTRACT

A compressing a voice signal by the steps of (a) digitizing an input signal that includes a voice signal, the input signal including a coherent noise component; and (b) compressing the digitized voice signal with a synchronized overlap add processor (20). So as to prevent the synchronized overlap add processor from locking to the coherent noise component, the step of compressing includes an initial step of applying the digitized input signal to a linear predictor (16), the linear predictor having time constants selected for attenuating the coherent noise component of the input signal. The residual signal output of the linear predictor includes the voice signal, and an uncorrelated noise component if one is present in the input signal. The operation of the synchronized overlap add processor also functions to attenuate the incoherent noise component. Further compression of the compressed voice signal is accomplished by Huffman coding, arithmetic coding, or transform coding so as to provide a greatly compressed voice signal that, when subsequently expanded, is found to exhibit excellent voice quality.

17 Claims, 3 Drawing Sheets

LOW BIT RATE VOICE TRANSMISSION FOR USE IN A NOISY ENVIRONMENT

FIELD OF THE INVENTION

This invention relates generally to voice communication methods and apparatus and, in particular, to methods and apparatus for transmitting a compressed digitized voice signal in the presence of noise.

BACKGROUND OF THE INVENTION

There are many applications where a very low bit rate digitized voice signal is useful. For example, any communication system having a limited bandwidth can implement more voice channels within the bandwidth if the voice data rate is reduced. Examples of such communication systems include, but are not limited to, cellular telephone systems and satellite communications systems, such as those that employ L band communications. In general, any satellite communication scheme can employ bit reduction techniques to simplify the processing of the signals.

A primary example of the use of low bit rate voice signals is the enciphered telephone system used by the military and intelligence communities. One conventional approach for maintaining privacy on telephone uses a 16 kbit/s continuously variable slope delta modulation scheme (CVSD) in the transmission of the voice signals. However, the quality of the voice is notoriously poor, and would most likely not be used were it not for the sensitive nature of the conversations. When the bit rate is expanded to 32 kbits per second, the quality of the CVSD voice is quite good, but the data rate is large enough to consume considerably more communication bandwidth than the usual telephone channel. By comparison, a standard digital telephone channel uses 64 kbits per second.

Another known technique that is used to achieve low bit rates is linear predictive coding (LPC). Linear predictive coding achieves bit rates of 2.4 kbits per second for poor quality, but intelligible speech. However, it is often impossible to recognize the speaker when using the LPC speech.

Furthermore, LPC exhibits a problem when a noise signal coexists with the desired voice signal, in that the prediction algorithm adapts to the noise as well as to the speech. The result is that, for low signal-to-noise ratios, the speech signal may nearly disappear. This is because the noise signal "captures" the Linear Predictive Coder, and any residual of the voice signal is greatly reduced in amplitude and quality. LPC furthermore .has difficulty with both white noise and with coherent noise. Examples of coherent noise are 60 Hz hum and the hum of machinery.

The following U.S. Patents all disclose various aspects of Linear Predictive Coding (LPC) as applied to speech: U.S. Pat. No. 4,718,087, entitled "Method and System Encoding Digital Speech Information", by Panagiotis E. Papamichalis; U.S. Pat. No. 4,720,861, entitled "Digital Speech Coding Circuit", by John P. Bertrand; U.S. Pat. No. 4,724,535, entitled "Low Bit-Rate Pattern Coding with Recursive Orthogonal Decision of Parameters", by Shigeru Ono; U.S. Pat. No. 4,797,925, entitled "Method for Coding Speech at Low Bit Rates", by Daniel Lin; U.S. Pat. No. 4,815,134, entitled "Very Low Rate Speech Encoder and Decoder" by Joseph W. Picone et al.; U.S. Pat. No. 4,903,303, entitled "Multi-Pulse Type Encoder Having A Low Transmission Rate", by Tetsu Taguchi; and U.S. Pat. No. 4,932,061, entitled "Multi-Pulse Excitation Linear-Predictive Speech Coder", by Peter Kroon et al.

Other known voice encoding techniques are not degraded by white noise, but do have difficulty with coherent noise. One example of such a technique is known as Synchronized-Overlap-Add (SOLA). By example, U.S. Pat. No. 4,864,620, entitled "Method for Performing Time-Scale Modification of Speech Information or Speech Signals", by L. Bialik discloses a method for determining a value of an overlap and a windowing of the speech signal. However, it is believed that the presence of correlated noise will capture the overlap calculation and degrade the speech quality.

The present inventors describe an improved SOLA technique in an article entitled. "Some improvements on the synchronized-overlap-add method of time-domain modification for real-time speech compression and noise filtering", IEEE Journal on Acoust. Speech and signal Proc., Vol. 36, 1988, pp. 139–40.

One of the most severe environments for voice compression is in a vehicle where there exists both white noise, due to, for example, the wind, and coherent road noise and motor noise. Achievement of low bit rate voice encoding in these circumstances is difficult.

It is thus one object of this invention to provide a low bit rate voice encoding technique that provides intelligible speech at low signal-to-noise ratios.

It is a further object of this invention to improve the signal-to-noise ratio for low bit rate encoded speech, and to suppress both white noise and coherent noise when digitally encoding speech.

SUMMARY OF THE INVENTION

The foregoing and other problems are overcome and the objects of the invention are realized by a low bit rate method for the transmission of voice signals, and by apparatus for accomplishing the method. Bit rates of one to two kbits per second, and below, are achieved for very good quality voice, where the speech is intelligible and the speaker is easily recognizable. The low bit rates are readily accomplished with the disclosed method when the voice signal has little interfering noise and, also, in the presence of both white noise and correlated noise. The method of the invention thus finds application in noisy environments, such as in vehicles or areas where machinery is in use.

In accordance with the invention, there is provided a method for compressing a voice signal by the steps of (a) digitizing an input signal that includes a voice signal, the input signal including a coherent noise component; and (b) compressing the voice signal with a synchronized overlap add processor. So as to prevent the synchronized overlap add processor from locking to the coherent noise component, the step of compressing includes an initial step of applying the digitized input signal to a linear predictor, the linear predictor having time constants selected for attenuating the coherent noise component of the input signal, but not significantly attenuating the voice signal. The residual signal output of the linear predictor thus includes the voice signal and also an uncorrelated noise component, if one is present in the input signal. The operation of the synchronized overlap add processor also functions to attenuate the incoherent noise component.

Further compression of the compressed voice signal is accomplished by Huffman coding, arithmetic coding, or transform coding so as to provide a greatly compressed voice signal that, when subsequently expanded, is found to exhibit excellent voice quality.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
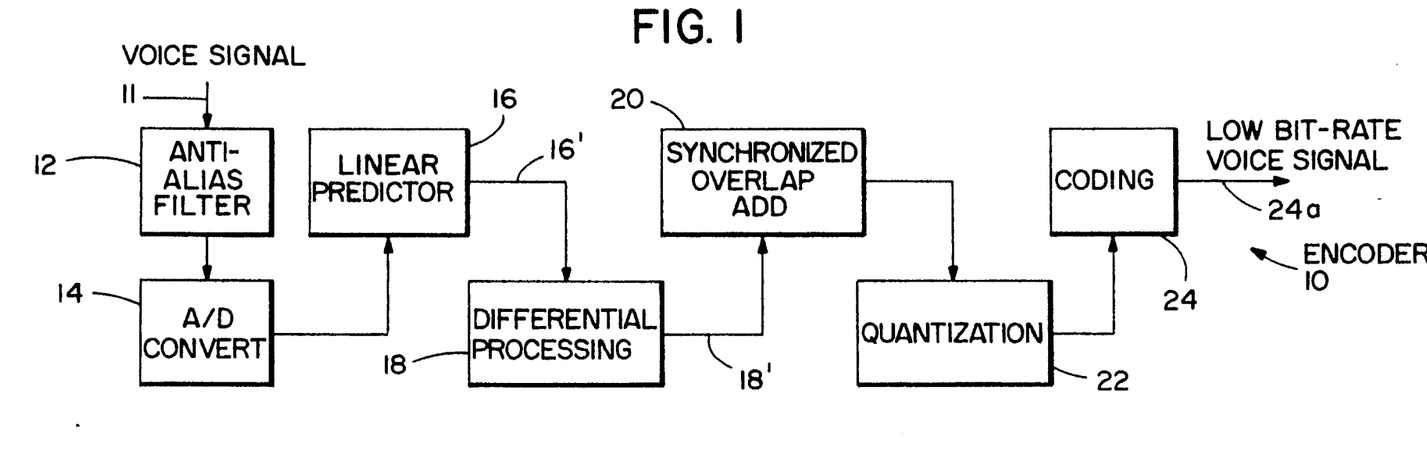
FIG. 1 is a circuit block diagram illustrating a voice compressor that is constructed and operated in accordance with the invention.
Figure 2:
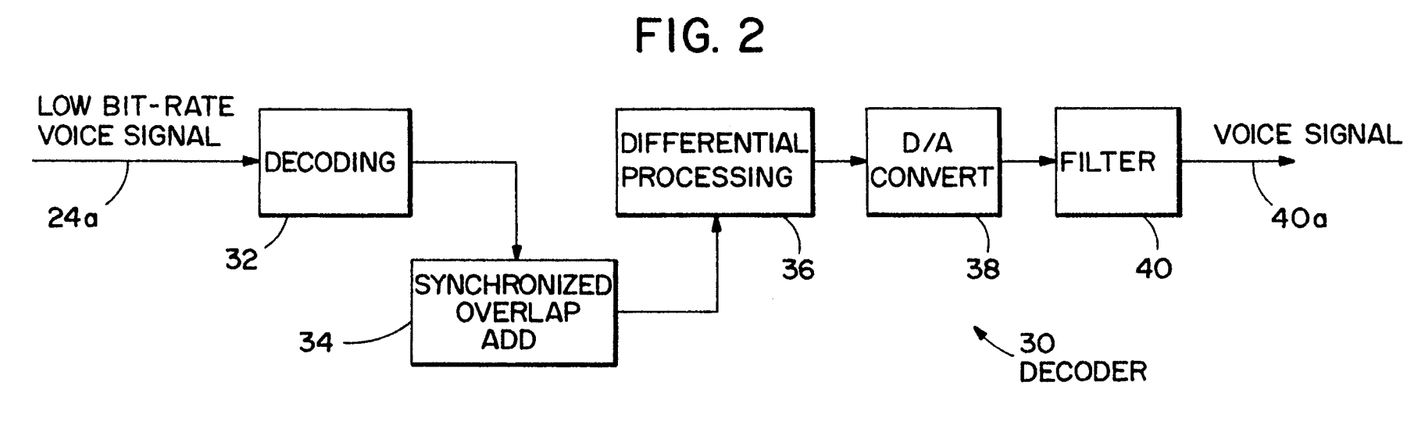
FIG. 2 is a circuit block diagram illustrating a voice decompressor that is constructed and operated in accordance with the invention.

A block diagram of a voice encoder 10 is shown in FIG. 1, and a corresponding voice decoder 30 is shown in FIG. 2. In FIG. 1 a voice signal 11 is filtered by a block 12 and digitized by an analog-to-digital (A/D) converter 14 at a convenient sample rate, such as the industry standard rate of 8000 samples per second, using 12 bit conversion. The signal 11 is filtered at block 12 to prevent aliasing by removing frequencies higher than 4000 Hz. The resulting high quality signal at the output of the A/D 14 has a bit rate of 96 kbits per second. In a telephone application the 12 bits is reduced to 8 bits by A law or Mu-law companding, which encodes the voice signal by using a simple non-linearity.

In accordance with an aspect of the invention, the converted voice signal is passed through a linear predictor 16 to remove the coherent noise. The linear predictor 16 differs from a conventional LPC filter in two important respects. First, the adaptation rate is set to be significantly slower than the adaptation rate for a conventional LPC. Second, the output 16' is not expressive of the value of the coder coefficients, but instead is the residual signal after the prediction. The significance of these distinctions is described below with respect to FIG. 3.

The voice signal is next passed through a differential processor 18 which operates by taking successive differences between samples to generate a continuous signal in the reconstruction. This technique eliminates one source of distortion in the signal.

The voice signal is next passed through a synchronized overlap and add (SOLA) processor 20. In accordance with an aspect of the invention, the SOLA processor 20 suppresses the white noise while also reducing the effective sample rate by an amount that is adjustable so as to achieve a desired quality in the reproduced signal. By example, when the signal is compressed by a factor of four the result is essentially transparent for the voice signal, and the noise is suppressed somewhat. At a compression ratio of 8 to 1, the result is nearly transparent. When the compression is 16 to 1, the reproduced voice signal is intelligible, but has begun to degrade.

The encoding process is completed by the coding of the voice signal by Blocks 22 and 24. The application of A law or Mu law companding by quantization block 22 reduces the signal, that is still basically a 12-bit signal, to an 8-bit signal. Any of several known techniques for information coding may then be applied by Block 24. Huffman coding is a well known technique for information coding, and is operable to reduce the signal to an average of two to four bits per sample. With this technique, and the good quality time compression of the signal provided by the SOLA processor 20, the resulting bit rate of the encoded voice is 2 kbits to 4 kbits per second.

Another suitable coding technique employs an arithmetic coder to achieve an encoding efficiency that is similar to that of the Huffman coder.

Yet another suitable coding technique is the use of a transform coder, or an adaptive transform coder. For this approach, the signal is transformed using a fast Fourier transform or other transform, typically a transform that can be executed using a fast algorithm. The transform coefficients are quantized, establishing the quality of the information coding process. The transform coefficients are then encoded using the Huffman or arithmetic coding techniques. In general, transform coding produces a 4:1 to 8:1 compression of the voice signal.

The resulting encoder output 24a, when using the transform coder, is 1 kbits per second to 2 kbits per second of high quality voice signal.

The decoder 30 of FIG. 2, for the low bit rate voice signal, follows the path of the encoder 10 in reverse. The signal is first passed through a decoder 32 to remove the Huffman or arithmetic information coding, and then through a reverse compander to remove the non-linearity of the companding. The signal is passed through a SOLA expander 34 to recover the original time scale of the signal. Finally the differential processing is removed by an inverse processing step performed by Block 36. It is noted that no attempt is made to reverse the linear prediction processing that was applied by Block 16 of FIG. 1, since to do so would add the coherent noise back to the original signal. The signal is then converted from digital to analog by a D/A block 38, and the analog signal is filtered by Block 40 to provide a high quality voice signal.

Based on the foregoing, it can be seen that a voice signal encoding method of the invention includes the steps of employing a linear predictor to suppress a coherent noise component of a digitized voice signal, differentially encoding the voice signal, performing a synchronized overlap add process to compress the voice signal, and coding the resultant compressed voice signal to further compress the voice signal to a desired low bit-rate.

The operation of the encoder 10 of FIG. 1 is now described in further detail with respect to FIGS. 3 through 6.

Figure 3:
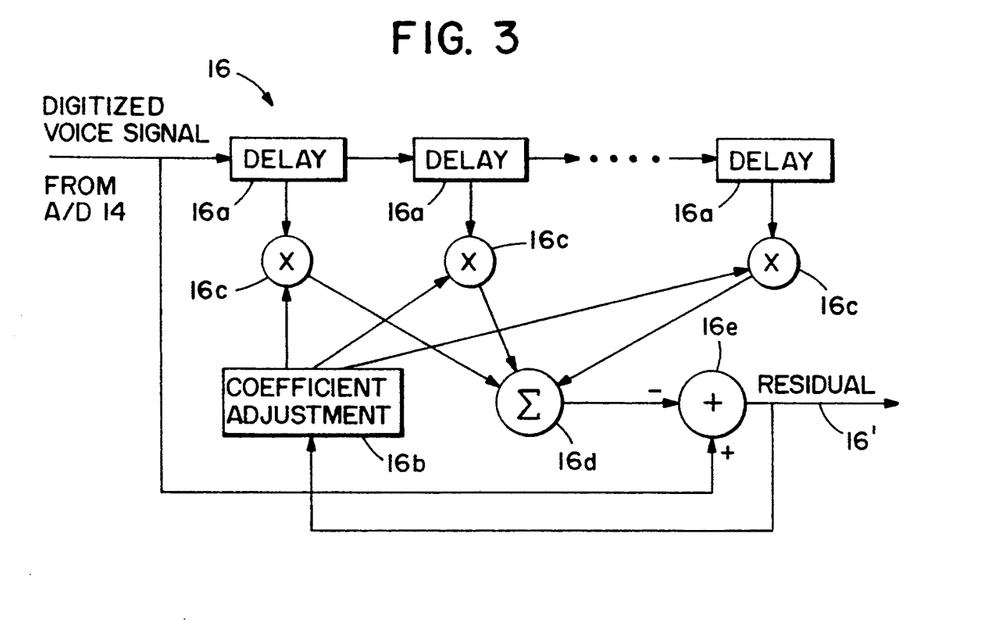
FIG. 3 is a circuit block diagram that illustrates in greater detail the linear predictor of FIG. 1.

A presently preferred embodiment of the linear predictor 16 is shown in FIG. 3. The digitized, sampled voice signal, including both coherent and white noise, is successively delayed by a plurality of serially coupled delay elements 16a. The collection of delayed samples are weighted by Blocks 16c and summed by Block 16d. The output is fedback to a coefficient adjustment block 16b and is used as a predictor of the incoming digitized voice signal sample. An error signal is generated by Block 16e by taking a difference between the incoming sample and the prediction output from the summation block 16d. As can be seen, the error is correlated with the digitized voice signal sample at each delay time, and is used to correct the coefficients used in the prediction.

The error signal output by Block 16e is the residual signal after the predicted signal is removed from the incoming signal. The signals that are removed from the input are those that can be predicted. In accordance with an aspect of the invention, and in that the voice signals rapidly change over a given period of, by example, one second, the time constants of the coefficient changes are set to be long with respect to one second. As a result, the voice signal is not predicted, and appears as the linear predictor 16 residual signal output 16'.

However, the more slowly varying coherent signals, such as 60 cycle hum, motor noise, and road noise, are predicted and are thus strongly attenuated in the residual signal output from the predictor 16.

It is noted that the attenuation of the frequencies of the longer term coherent noise has some effect on the voice signal. That is, the frequencies that are prominent in the coherent noise are attenuated for all of the signals, including the voice signal. It has been found that the attenuation of some of the frequencies below 300 Hz occurs, in that this is where most of the coherent noise is concentrated.

Figure 4:
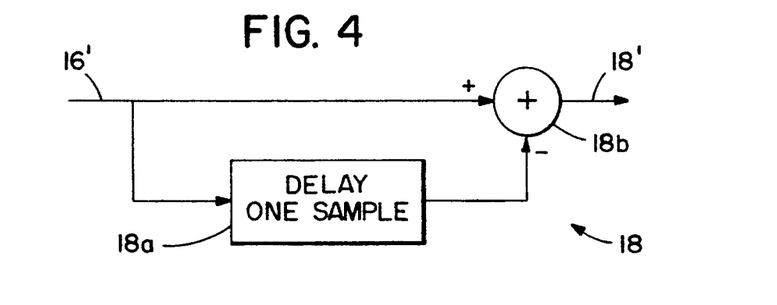
FIG. 4 is a circuit block diagram that illustrates in greater detail the differential processor of FIG. 1.

A presently preferred embodiment of the differential processor 18 is shown in FIG. 4. The differential processor 18 includes a one sample delay element 18a that delays the linear predictor residual signal 16' by one sample time. A Block 18b takes the difference between the signal 16', and the delayed signal output by the delay block 18a, and provides an output signal 18'.

Figure 5:
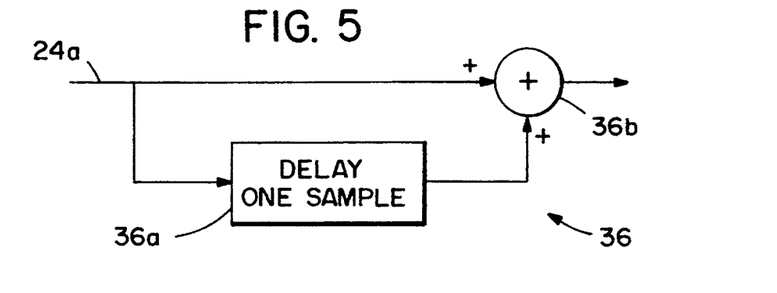
FIG. 5 is a circuit block diagram that illustrates in greater detail the differential processor of FIG. 2.

As seen in FIG. 5, for the receiver (decoder 30) the differential processing is reversed. That is, the delayed signal is added back to the original signal. This process makes the output signal at the receiver continuous, with no large discontinuities in the waveform at lower frequencies. The result is that a transient in the signal, at the frequency of the blocking of the signal during subsequent processing, is prevented.

It is noted that the differential processors 18 and 30 are not required to implement the teaching of the invention. However, the inclusion of the differential processors 18 and 30 is advantageous in that the reconstructed speech is made smoother, and also the higher frequencies are emphasized, which is a desirable feature when processing voice signals.

Figure 6:
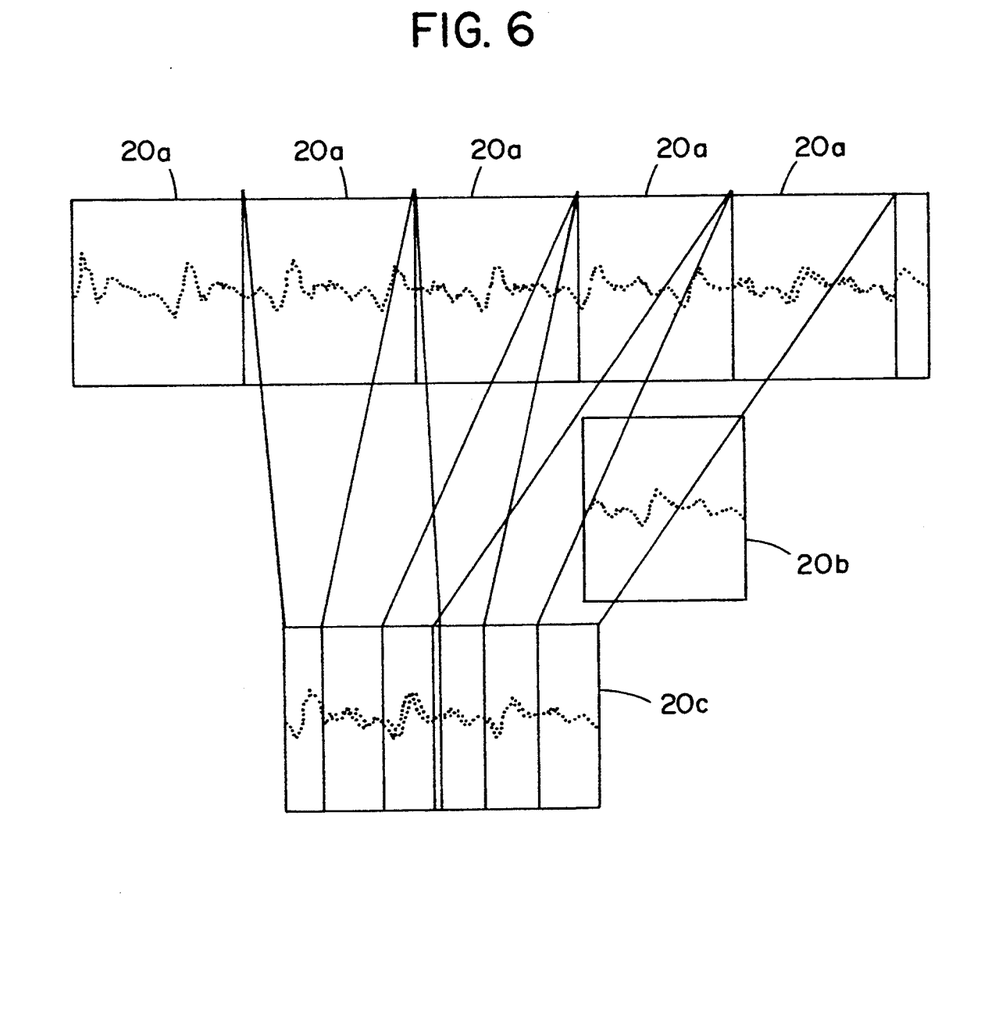
FIG. 6 is a waveform diagram that illustrates the operation of the Synchronized-Overlap-Add processor of FIG. 1.

The operation of the SOLA processor 20 is shown diagrammatically in FIG. 6. The incoming signal is segmented into blocks 20a of from 10 milliseconds to 100 milliseconds in length. A new signal comprised of significantly fewer samples is then generated by overlapping a new block 20b with the existing output signal 20c, by an amount proportional to the desired sample rate reduction. The new block 20b is then added back to the output signal 20c. The new block 20b is moved in time, compared to the output signal 20c, so that the new block is "synchronized" with the output signal. The amount that the new block is moved from the nominal overlap is determined by performing a correlation of the new block 20b, shifted from the nominal overlap, with the output signal 20c. The amount of shift that is found to exhibit the greatest correlation is the position for adding back the new signal block.

In the reconstruction process performed by the SOLA processor 34 of FIG. 2, a collection of segments equal to the length of the original segments are formed. A segment from the compressed signal is shifted and added back to the output signal. The amount of the shift is equal to the shift of the input, but in the opposite direction, thereby re-expanding the signal. By marking the point in the output signal where each of the input segments begins, the correlation process is not required to be performed on the output cycle. Alternatively, the correlation process can be performed in the output cycle, eliminating the overhead of adding in marks from the data chain.

In greater detail, and as described by the present inventors in the above referenced article entitled "Some improvements on the synchronized-overlap-add method of time-domain modification for real-time speech compression and noise filtering" IEEE Journal on Acoust. Speech and Signal Proc., Vol. 36, 1988, pp. 139p-140, a presently preferred SOLA method begins with overlapping frames of time domain data. Frame length is defined as N, the amount of new data per frame is $S_a$, and the amount of overlap is thus $N-S_a$. Compression is achieved by "accordioning" these frames (shifting to increase the amount of overlap) and averaging, such that the amount of new data per frame is $S_s$ (where $S_s<S_a$). For expansion, the shifting is accomplished to decrease the amount of overlap ($S_a>S_a$). The ratio of $S_s/S_a$ is referred to as the modification factor, $\alpha$. For compression, $\alpha<1$, while for expansion $\alpha>1$.

If the accordioning is of the same amount for all frames, the resulting speech is of poor quality. Thus, the SOLA processor 20 varies the degree of accordioning such that the amount of new data per frame averages $S_s$, but is allowed to vary by an amount $k_m$ at any particular overlapping, where m is the frame number. The amount $k_m$, also referred to as $\Delta S_s$, may take on any value between $\pm N/2$. In general, $k_m$ is chosen such that the cross-correlation between the new frame and the averaged values of the previous frames is maximized. That is, $k_m$ is the value of k that maximizes $$R_m(k) = \frac{\sum_{j=0}^{L-1} y(mS_s + k + j) \times (mS_a + j)}{\left[\sum_{j=0}^{L-1} y^2(mS_s + k + j) \sum_{j=0}^{L-1} x^2(mS_a + j)\right]^{\frac{1}{2}}}$$

$$N/2 \leq k \leq N/2$$

as indicated by S. Roucos and A.M. Wilgus in "High Quality Time Scale Modification for Speech", Prosc. ICASSP '85, pp. 493–496 (1985), where L is the length of overlap between the new signal samples $x(mS_a+j)$ and the composite vector y formed by averaging previous overlapped vectors.

The vector y is updated by each new vector x, once $k_m$ is found, by the formula $$y(mS_s + k_m + j) = (1 - f(j))y(mS_s + k_m + j) + f(j) \times (mS_a + j)$$
$$\text{for } 0 \leq j \leq L_m - 1,$$

and $$y(mS_s + k_m + j) = x(mS_a + j)$$
$$\text{for } L_m \leq j \leq N - 1,$$

where f(j) is a weighting function and $L_m$ is the length of the overlap of the two vectors x and y for the particular $k_m$ involved. The method is initialized by setting the first $y(j)=x(j), j=1...N$. This implies that $k_1$ will always be $-S_s$ (for non-trivial signals) because the maximum cross-correlation will occur when each y $(mS_s+k+j)=x(mS_a+j)$, for $j=1...N$. This occurs for the first iteration of the method when $k=-S_s$.

The compression ratio is asymptotically $S_s/S_a$, that is, the amount of new data in each output frame divided by the amount of new data in each overlapped input frame.

The SOLA processor 20 is responsible for the large compression achieved with this technique, relative to conventional techniques. The voice signal may be compressed by more than 8:1 before the voice signal quality significantly degrades.

The SOLA processor 20 is also responsible for the suppression of the uncorrelated noise in that, as each segment is overlapped and added, there is a coherent adding of the voice signal and an incoherent adding of the noise. The result is an increase in the signal-to-noise ratio that is proportional to the square root of the number of segments that overlap. For an 8:1 overlap the signal-to-noise ratio improves by a factor of 2.83, or approximately 9 dB, a significant improvement.

It has been found that the SOLA processor 20 does not operate as well in the presence of coherent noise, in that the correlation process that establishes the overlap is distorted by the presence of the underlying coherent noise. When the noise is uncorrelated there is no particular bias in the correlation and, consequently, the overlap due to the noise. However, when the noise is correlated, and is also strong compared to the voice signal, it can overwhelm the voice signal, resulting in a correlation that locks to the underlying coherent noise signal. The result is a capture of the SOLA processor 20 by the coherent noise and a suppression and tearing of the voice signal, resulting in a poor quality signal.

In accordance with the teaching of the invention, the linear predictor 16 of FIG. 3 overcomes this difficulty by strongly attenuating the coherent noise component of the incoming signal. As a result, the input to the SOLA processor 20 is substantially free of coherent noise, which enables the SOLA processor 20 to operate, as described above, in an optimal fashion on only the voice signal and the incoherent "white" noise.

As was described above, one known technique for coding of the signal is Huffman coding. The signal from the SOLA processor 20 is passed through an A law or Mu law compander to reduce each signal sample from 12 bits tip 8 bits. The sample is further reduced to the output code word by using a short code word for the more probable values, and longer code words for less probable values. A typical compression ratio for this encoding technique is approximately 2.5 to 1. The resulting output voice signal data stream contains approximately 3.2 bits per sample on the average. The average bit rate for good quality speech is approximately 3.5 kbits per second. At 6 kbits to 7 kbits per second the quality is very good. At 1.5 kbits per second the voices is intelligible, but of poor quality.

Details of Huffman coding are found in "Information Theory and Coding", by N. Abramson, McGraw-Hill Book Company, New York, (1963).

The above described arithmetic coding technique achieves a level of coding that is comparable to the Huffman coding. The coding begins from the same 8-bit companded signal as the Huffman coder discussed above. The arithmetic interval represented by the 8-bits is divided into two equally probable intervals, and the sample is tested to determine which of the two intervals contains the sample. It should be noted that the intervals are not equal for most signal types, including the compressed, companded voice signal being considered. The choice of the interval containing the sample establishes the first bit. The selected interval is then subdivided into equally probable segments, and the subinterval containing the sample is selected establishing the next bit in the code sequence. When the subinterval is sufficiently small, the coding terminates and the code word is added to the output stream.

Details of arithmetic coding are found in "Adaptive Data Compression" by R. Williams, Kluwer Academic Publishers, Boston (1991).

The above mentioned transform coding technique achieves a greater compression ratio by better exploiting the structure of the voice signal. In operation, a block of data is transformed using one of several possible transforms. Suitable transforms include the Fourier transform and the related cosine or Hadamard transforms. The result is a representation of the signal block by a set of transform coefficients. If the transform is properly selected, only a few of the transform coefficients are large, while the remainder are near zero. The coefficients may then be quantized to achieve a selected level of distortion, and then encoded for transmission. The information coding may be the Huffman coder, the arithmetic coder, or some other information coder.

The transform coding achieves an 8:1 compression with good voice quality, as compared to the 3:1 compression achieved with the use of the Huffman coder or the arithmetic coder alone.

Details of transform coding for voice signals are found in section 7.8 of "Speech Communication", D. O'Shaugnessy, Addison-Wesley, New York, 1990.

The compressed signal that is processed by the transform coder is the companded 8-bit per sample, 1000 sample per second signal. The transform coding reduces the 8-kbits per second data stream to on the order of 1-kbits per second. When the voice signal is decoded, reverse transformed, and expanded at the receiver, very good quality speech is reproduced. When the speech is noise-free (at the source), the quality of the speech is very good indeed. When there is noise, the quality of the speech degrades as the signal-to-noise ratio decreases. The noise is not coded to be reproduced, with the result that the noise distortion does not resemble the noise at the input, but appears instead as a distortion of the speech signal. However, the process of the compression and encoding operates to suppress the noise, as discussed above. As a result, the resulting signal sounds superior to the original signal in many high noise environments.

One technique for reducing the data rate for voice signals is to send the voice signal through the channel only when there is a voice signal. Typically, a person in an exchange of conversation speaks less than half the time. In an unbiased conversation, each of the participants is speaking one half the time. Even when a person is speaking, there are pauses in the speech between phrases and between thoughts.

Thus, a well-known voice detector added to the encoder 10 of FIG. 1 enables the average data rate to be reduced to below 500 bits per second, by disabling the transmission of the voice signal 24a in the absence of a voice input signal.

A presently preferred method for achieving re-expansion of the compressed voice signal by the SOLA processor 34 of FIG. 2 is also described in the above mentioned article entitled "Some improvements on the synchronized-overlap-add method of time-domain modification for real-time speech compression and noise filtering", IEEE Journal on Acoust. Speech and Signal Proc., Vol. 36, 1988, pp. 139–140.

In summary, the teaching of the invention provides a method for transmitting a voice signal with a low bit rate. The method of the invention reduces the coherent noise in one step and reduces the white, or non-coherent noise, is another step. Voice compression is accomplished in accordance with the SOLA technique, and also during a subsequent information coding step. The teaching of the invention significantly enhances the operation of the SOLA process in a noisy environment by suppressing or removing coherent noise with the linear predictive coder 16. The differential processor reduces an annoying repetitive "whine" component in the signal. The SOLA processor 20 also reduces the white noise.

The result is a voice processing system capable of producing high quality voice signals. When there is little noise, the voice signal is of very good quality at data rates as low as approximately 1-kbit per second. When there is either coherent noise or white noise, the data rates may still be as low as approximately 1-kbit per second, but the noise causes some degradation in the voice signal. If the transform coding process is employed, the perception is not that there is added noise, but that the voice signal is somewhat distorted.

The various processing blocks shown in FIGS. 1-5 may be implemented with discrete circuit components, or with a combination of discrete circuit components and a suitably programmed digital signal processor (DSP). Furthermore, other voice processing functions, other than those described above, may also be accomplished while processing the voice signal. One example is the use of the above mentioned voice detector. Furthermore, the method and apparatus taught by the invention may be employed to process audio signals in general, and are not limited for use solely with voice signals.

Thus, while the invention has been particularly shown and described with respect to preferred embodiments thereof, it will be understood by those skilled in the art that changes inform and details may by made therein without departing from the scope and spirit of the invention.

What is claimed is:

1. A method for processing an audio signal, comprising the steps of:

digitizing an input signal that includes an audio signal component, a coherent noise signal component, and a non-coherent noise component;

applying the digitized audio signal to a linear predictor means, the linear predictor means having a plurality of serially coupled time delay elements wherein a time delay between adjacent time delay elements is selected for attenuating the coherent noise component of the input signal, said linear predictor means having a residual output signal that is representative of the audio signal component and the non-coherent noise component, less the coherent noise component;

applying the residual output signal to a synchronized overlap add processor means for compressing the audio signal component in accordance with a compression ratio, the synchronized overlap add processor means furthermore attenuating the non-coherent noise component of the input signal; and further compressing the audio signal component with encoder means to provide a digital output signal that is expressive of the audio signal component.

2. A method as set forth in claim 1 wherein the compression ratio is within a range of approximately 4:1 to approximately 16:1.

3. A method as set forth in claim 1 wherein the step of further compressing is accomplished by a coding method selected from the group consisting essentially of a Huffman coding method, an arithmetic coding method, and a transform coding method.

4. A method as set forth in claim 1 wherein the step of further compressing includes an initial step of companding the compressed audio signal component.

5. A method as set forth in claim 1 wherein the step of applying the residual output signal having the attenuated coherent noise component to a synchronized overlap add processor means includes an initial step of first applying the residual output signal having the attenuated noise component to a differential processing means that includes means for delaying a sample of the audio signal component, and for subtracting the delayed sample from a current sample of the audio signal component.

6. A method for compressing a voice signal, comprising the steps of:

digitizing an input signal that includes a voice signal component to provide a digitized input signal, the digitized input signal further including a coherent noise component; and compressing the digitized input signal with a synchronized overlap add processor means, wherein, so as to prevent the synchronized overlap add processor means from locking to the coherent noise component, the step of compressing includes an initial step of applying the digitized input signal to a linear predictor means, the linear predictor means having a plurality of serially coupled time delay elements wherein a time delay between adjacent time delay elements is selected for attenuating the coherent noise component, said linear predictor means having a residual output signal that is representative of the voice signal component, less the coherent noise component, the residual output signal being applied to an input of the synchronized overlap add processor means for compression thereby.

7. A method as set forth in claim 6 wherein the digitized input signal further includes a non-coherent noise component, and wherein the step of compressing includes a step of attenuating the non-coherent noise component of the digitized input signal.

8. A method as set forth in claim 6 and further including a step of further compressing the digitized input signal by encoding the compressed digital voice signal component to provide a digital output signal that is expressive of the voice signal component, wherein the step of encoding is selected from a coding technique selected from the group consisting essentially of a Huffman coding technique, an arithmetic coding technique, and a transform coding technique.

9. A method as set forth in claim 6 wherein the step of compressing compresses the digitized voice signal component in accordance with a compression ratio in the range of approximately 4:1 to approximately 16:1.

10. A method as set forth in claim 6 wherein the step of applying is followed by a step of applying the residual output of the linear predictor means to a differential processing means that includes means for delaying a sample of the digitized voice signal component, and for subtracting the delayed sample from a current sample of the digitized voice signal component.

11. A method as set forth in claim 6 and further comprising the steps of:
further compressing the digitized voice signal component by encoding the compressed voice signal component in accordance with a technique selected to provide a digital output signal that is expressive of the voice signal component;
wherein the step of applying is followed by a step of applying the digitized voice signal component having the attenuated coherent noise component to a first differential processing means that includes means for delaying a sample of the digitized voice signal component, and for subtracting the delayed sample from a current sample of the digitized voice signal component; and a step of
expanding the further compressed digitized voice signal component, the step of expanding including the steps of,
decoding the further compressed digitized voice signal component in accordance with the technique selected to provide a partially expanded voice signal component;
decompressing the partially expanded digitized voice signal component with a second synchronized overlap add processor means;
applying the further decompressed digitized voice signal component to a second differential processing means that includes means for delaying a sample of the decompressed digitized voice signal component, and for adding the delayed sample to a current sample of the decompressed digitized voice signal component; and
converting the decompressed digitized voice signal component to an analog voice signal.

12. Apparatus for compressing a voice signal, comprising:
means for digitizing an input signal that includes a voice signal component, the input signal further including a coherent noise component; and
means for compressing the digitized input signal, said compressing means including a synchronized overlap add processor means, wherein, so as to prevent the synchronized overlap add processor means from locking to the coherent noise component, the apparatus further includes
linear predictor means interposed between said digitizing means and said compressing means, said linear predictor means having a plurality of serially coupled time delay elements wherein a time delay between adjacent time delay elements is selected for attenuating the coherent noise component, said linear predictor means having a residual output signal that is representative of the voice signal component, less the coherent noise component, the residual output signal being applied to an input of the synchronized overlap add processor means for compression thereby.

13. Apparatus as set forth in claim 12 wherein the input signal further includes a non-coherent noise component, and wherein said synchronized overlap add processor means includes means for attenuating the non-coherent noise component of the input signal.

14. Apparatus as set forth in claim 12 and further including encoder means for further compressing the compressed digitized voice signal component to provide a digital output signal that is expressive of the voice signal component, wherein the encoder means is selected from a group consisting essentially of a Huffman coding means, an arithmetic coding means, and a transform coding means.

15. Apparatus as set forth in claim 12 wherein the compressing means compresses the digitized voice signal component in accordance with a compression ratio in the range of approximately 4:1 to approximately 16:1.

16. Apparatus as set forth in claim 12 and further including differential processing means interposed between said linear predictor means and said compressing means, said differential processing means including means for delaying a sample of the digitized voice signal component, and means for subtracting the delayed sample from a current sample.

17. Apparatus as set forth in claim 12 and further comprising:
means for further compressing the digitized voice signal component by encoding the compressed digitized voice signal component in accordance with a technique selected to provide a digital output signal that is expressive of the voice signal component;
first differential processing means interposed between said linear predictor means and said compressing means, said first differential processing means including means for delaying a sample of the digitized voice signal component, and means for subtracting the delayed sample from a current sample; and
further including means for expanding the further compressed digitized voice signal component, said expanding means including,
means for decoding the further compressed digitized voice signal component in accordance with the selected technique to provide a partially expanded digitized voice signal component;
means for decompressing the partially expanded digitized voice signal component with a second synchronized overlap add processor means;
second differential processing means that includes means for delaying a sample of the decompressed digitized voice signal component, and for adding the delayed sample to a current sample of the decompressed digitized voice signal component; and
means for converting the decompressed digitized voice signal component to an analog voice signal.

* * * * *

UNITED STATES PATENT AND TRADEMARK OFFICE
CERTIFICATE OF CORRECTION

PATENT NO. : 5,353,374
DATED : October 4, 1994
INVENTOR(S) : Wilson et al.

It is certified that error appears in the above-identified patent and that said Letters Patent is hereby corrected as shown below:

In col. 9, claim 1, line 57, delete "applying" and insert --attenuating the coherent noise component of--.

In col. 9, claim 1, line 57, delete "to" and insert --with--.

In col. 9, claim 1, line 58, delete "means, the linear predictor means".

In col. 9, claim 1, line 59, after "elements" insert --,-- (a comma).

In col. 9, claim 1, lines 62 and 63, delete "said linear predictor means having" and insert --the step of attenuating including a step of generating--.

In col. 9, claim 1, line 67, delete "applying" and insert --compressing the audio signal component of--.

In col. 9, claim 1, line 67, delete "to a" and insert --with a--.

In col. 9, claim 1, line 68, to col. 10, claim 1, line 1, delete "means for compressing the audio signal component".

In col. 10, claim 1, lines 2 and 3, delete "synchronized overlap add processor means furthermore" and insert --step of compressing including a step of--.

In col. 10, claim 1, lines 5 and 6, delete "with encoder means".

UNITED STATES PATENT AND TRADEMARK OFFICE
CERTIFICATE OF CORRECTION

PATENT NO. : 5,353,374

DATED : October 4, 1994

INVENTOR(S) : Wilson et al.

It is certified that error appears in the above-identified patent and that said Letters Patent is hereby corrected as shown below:

In col. 10, claim 5, line 19, after "of" insert --compressing the audio signal component of the residual output signal--.

In col. 10, claim 5, lines 20-22, delete "applying the residual output signal having the attenuated coherent noise component to a synchronized overlap add processor means".

In col. 10, claim 5, lines 22 and 23, delete "first applying" and insert --processing--.

In col. 10, claim 5, line 24, delete "to" and insert --with--.

In col. 10, claim 5, lines 24 and 25, delete "processing means that includes means for" and insert --processor, the step of processing including the steps of--.

In col. 10, claim 5, line 26, delete "for".

In col. 10, claim 6, line 39, delete "an" and insert --the--.

In col. 10, claim 6, line 40, delete "step" and insert --steps--.

In col. 10, claim 6, line 41, delete "applying" and insert --attenuating the coherent noise component of--.

In col. 10, claim 6, line 41, delete "to" and insert --with--.

In col. 10, claim 6, line 42, delete "means, the linear predictor means".

UNITED STATES PATENT AND TRADEMARK OFFICE
CERTIFICATE OF CORRECTION

PATENT NO. : 5,353,374

DATED : October 4, 1994

INVENTOR(S) : Wilson et al.

It is certified that error appears in the above-identified patent and that said Letters Patent is hereby corrected as shown below:

In col. 10, claim 6, line 43, after "elements" insert --,-- (a comma).

In col. 10, claim 6, lines 46 and 47, delete "said linear predictor means having" and insert --the step of attenuating including a step of generating--.

In col. 10, claim 6, line 49, after "component" insert --; and inputting the residual output signal to the--.

In col. 10, claim 6, line 49, delete ", the residual output signal being applied to an input of".

In col. 10, claim 8, line 60, after "by" insert --a step of--.

In col. 11, claim 10, line 4, delete "applying" (first occurrence) and insert --attenuating the coherent noise component of the digitized input signal--.

In col. 11, claim 10, line 4, delete "applying" (second occurrence) and insert --processing--.

In col. 11, claim 10, line 5, delete "of the linear predictor means" and insert --signal with--.

In col. 11, claim 10, line 6, delete "processing means that includes means for" and insert --processor, the step of processing including the steps of--.

In col. 11, claim 10, line 7, after "component" delete "," (the comma).

UNITED STATES PATENT AND TRADEMARK OFFICE
CERTIFICATE OF CORRECTION

PATENT NO. : 5,353,374

DATED : October 4, 1994

INVENTOR(S) : Wilson et al.

It is certified that error appears in the above-identified patent and that said Letters Patent is hereby corrected as shown below:

In col. 11, claim 10, line 7, after "and" delete "for".

In col. 11, claim 11, line 13, after "by" insert --a step of--.

In col. 11, claim 11, line 14, after "a" insert --predetermined--.

In col. 11, claim 11, line 17, delete "applying" and insert --attenuating the coherent noise component of the digitized input signal--.

In col. 11, claim 11, line 18, delete "applying" and insert --processing--.

In col. 11, claim 11, line 19, delete "to" and insert --with--.

In col. 11, claim 11, lines 20 and 21, delete "processing means that includes means for" and insert --processor, the step of processing including the steps of--.

In col. 11, claim 11, line 22, after "component" delete "," (the comma).

In col. 11, claim 11, line 22, after "and" delete "for".

In col. 11, claim 11, line 29, after "the" insert --predetermined--

In col. 11, claim 11, line 30, delete "selected".

UNITED STATES PATENT AND TRADEMARK OFFICE
CERTIFICATE OF CORRECTION

PATENT NO. : 5,353,374

DATED : October 4, 1994

INVENTOR(S) : Wilson et al.

It is certified that error appears in the above-indentified patent and that said Letters Patent is hereby corrected as shown below:

In col. 11, claim 11, line 30, after "expanded" insert --digitized--.

In col. 11, claim 11, line 34, after "means" and before the ";" (semi-colon) insert --to generate a further decompressed digitized voice signal component--.

In col. 11, claim 11, line 35, delete "applying" and insert --processing--.

In col. 11, claim 11, line 36, delete "to" and insert --with--.

In col. 11, claim 11, lines 36 and 37, delete "processing means that includes means for" and insert --processor, the step of processing the further decompressed digitized voice signal component including the steps of--.

In col. 11, claim 11, line 39, after "component" delete "," (the comma).

UNITED STATES PATENT AND TRADEMARK OFFICE
CERTIFICATE OF CORRECTION

PATENT NO. : 5,353,374
DATED : October 4, 1994
INVENTOR(S) : Wilson et al.

It is certified that error appears in the above-indentified patent and that said Letters Patent is hereby corrected as shown below:

In col. 11, claim 11, line 39, after "and" delete "for".

Signed and Sealed this

Twenty-seventh Day of December, 1994

Attest:

BRUCE LEHMAN

*Attesting Officer*  *Commissioner of Patents and Trademarks*